April 20, 1937. W. R. WILEY 2,077,605
MECHANISM FOR POSITIONING ATTACHING CLIPS IN A MOLDING STRIP
Filed Feb. 10, 1936 2 Sheets-Sheet 1

William R. Wiley
INVENTOR.

BY Swan Frye and Hardesty
ATTORNEYS.

April 20, 1937.  W. R. WILEY  2,077,605
MECHANISM FOR POSITIONING ATTACHING CLIPS IN A MOLDING STRIP
Filed Feb. 10, 1936   2 Sheets-Sheet 2
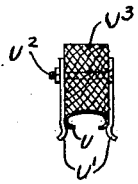
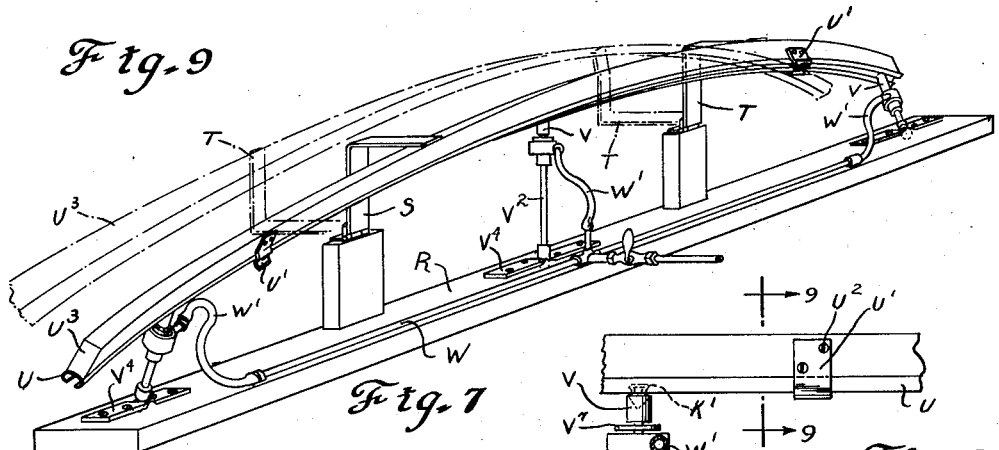
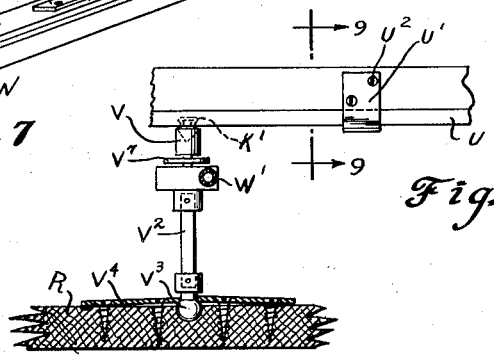
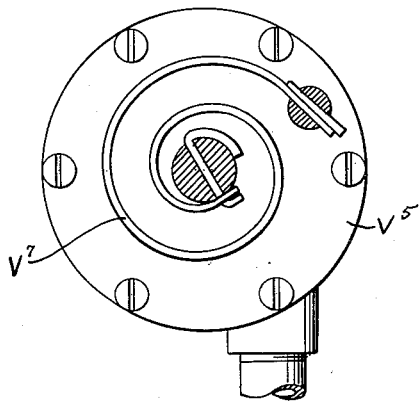
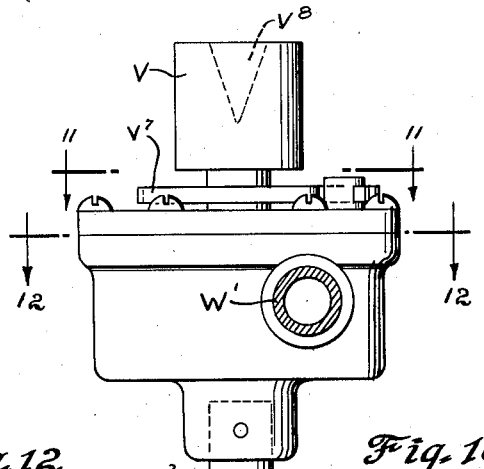
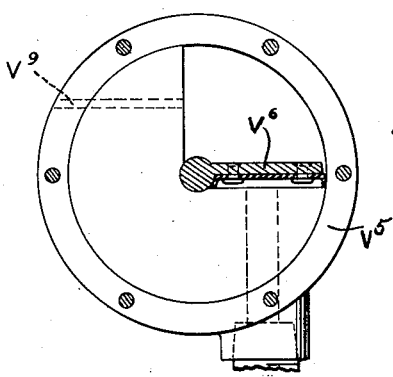
William R. Wiley
INVENTOR.
BY Swan Foye and Hardesty
ATTORNEY.

Patented Apr. 20, 1937

2,077,605

UNITED STATES PATENT OFFICE 2,077,605

MECHANISM FOR POSITIONING ATTACHING CLIPS IN A MOLDING STRIP

William R. Wiley, Detroit, Mich.

Application February 10, 1936, Serial No. 63,283

9 Claims. (Cl. 29—84)

This invention relates to a preferred form of mechanism for effecting the attachment of anchoring clips in multiple to a molding strip, the molding strip being thereafter positioned upon a supporting panel, as, for example, the side panel or door panel of a motor vehicle, and has for its object an improved device of this type, by means of which the several clips deemed to be needed for the described positioning of a molding strip upon a panel at suitable intervals therealong may be placed in position at a single operation.

While I shall describe the mechanism as using a preferred form of clip which forms the subject of a copending application for patent by myself, it will be obvious that other and variant types of clips may be handled by this mechanism, subject to the changes in its clip-engaging parts which the variant contouring of the clips may involve.

Figure 7 is a perspective of a modified form of construction for effecting the positioning of the clips which it may sometimes be advantageous to employ, and also bringing out the fact that an appreciable portion of the molding strips wherein clips are to be installed are of other than straight contouring, being bent in the course of their fabrication to conform to special curvatures of a motor vehicle body or the like, wherein a straight molding is not the form desired.

Figure 8 is a detail elevational view partly in section of one of the stud turning units employed in the modified construction shown in Figure 7.

Figure 9 is a cross sectional elevational view of a molding strip and its temporary holding piece, taken along the line 9—9 of Figure 8, and looking in the direction of the arrows there shown.

Figure 10 is a large scale elevational view of the preferred form of pneumatically actuated turrets employed in the construction of Figures 7 and 8.

Figure 11 is a plan view of the form of turret illustrated in Figure 10, being taken along the line 11—11 of Figure 10, and looking in the direction of the arrows there shown.

Figure 12 is a sectional plan view taken along the line 12—12 of Figure 10, and looking in the direction of the arrows there shown.

Figure 1:
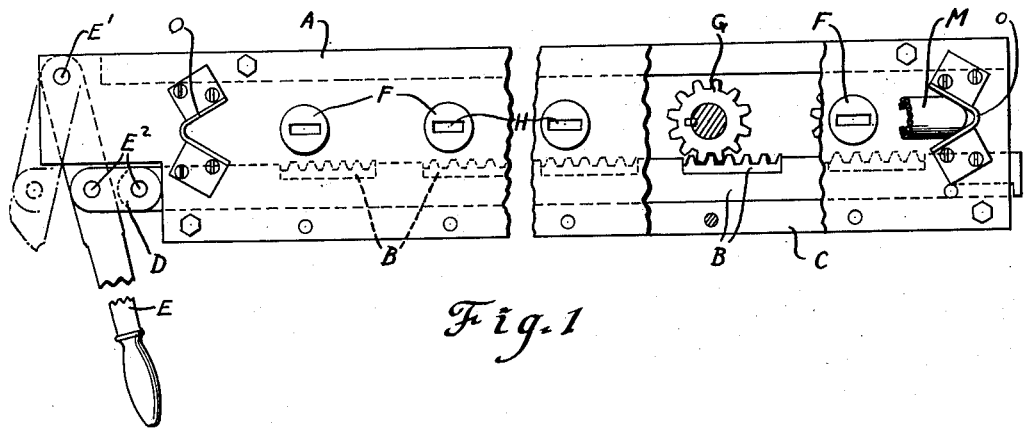
Figure 1 is a plan view of one form of my preferred mechanism.
Figure 2:
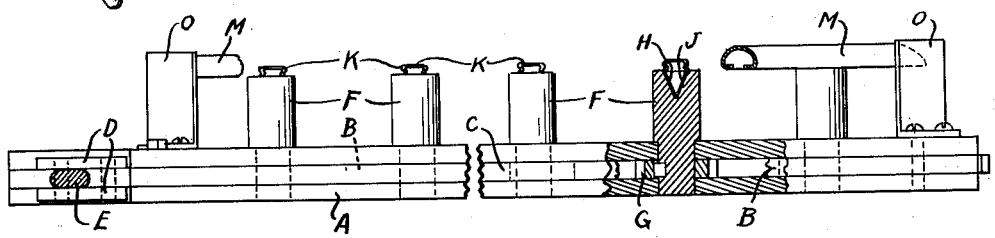
Figure 2 is a side elevational view thereof.
Figure 4:
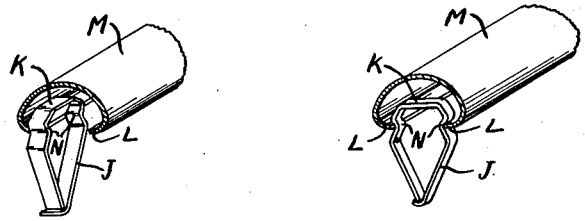
Figure 4 is a perspective of an attaching clip and of a section of molding strip, showing the clip in its first installed position relatively to the molding strip and corresponding to the showing in the left hand portion of Figure 3.
Figure 5:
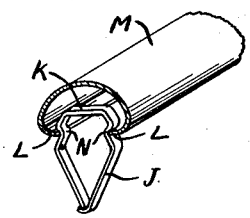
Figure 5 is a similar perspective of the clip and of a section of molding strip showing its final positioning relatively to the molding strip as indicated on the right hand half of Figure 3.
Figure 3:
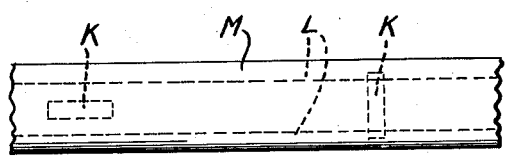
Figure 3 is a top view of a molding clip section with the initial and the final or seated position of the clip therewithin indicated in dotted lines.

Referring first to the form of mechanism shown in Figures 1 and 2, A indicates a frame, and B a rack bar positioned lengthwise thereof and slightly above the plane of the frame A. This rack bar is slidably supported in the frame, as at C, and it is actuatable lengthwise thereof by the handle E, which is pivoted to the frame at E' and to the rack bar, as at E², through the link D.

Supported on the top surface of the frame piece at selected intervals therealong are a plurality of turrets, as F, each one of which is provided with a gear G, which lies in the plane of the rack bar B, with its teeth interengaging therewith.

Each one of these turrets is provided with an indentation H, as illustrated in section in Figure 2, of V-shaped cross sectional contour, and in the initial position of the mechanism each one of these indentations is positioned lengthwise of the supporting frame A as a whole. Viewed from above, as in Figure 1, each one of these indentations H is suggestive of the kerf in the head of a screw.

Into each one of these turret indentations the tapered body portion, as J, of a unitary clip is dropped, so that the head portion, as K, of each clip similarly extends lengthwise of the frame. The breadth of each clip, particularly its head portion, is such that it can be easily passed between the opposing edges of the inturned flanges L of a molding strip M, and when all of the turret apertures have been filled or loaded, each with a clip, a length of molding strip M is positioned over these lengthwise-extending clip heads K and held firmly in position, either manually, and being rested on the terminal supports O, or by suitable mechanism, such as an over-engaging vise or the like. The handle E is then actuated, causing the rack bar B to move lengthwise of the base frame A, and consequently to rotatively actuate each turret, because of the interengagement of its teeth with those on each of the gear wheels G. The degree of possible lengthwise travel of the rack bar is regulated so that it effects the rotative movement of each of the turrets F only through a 90° angle. This movement of the turrets effects the corresponding turning of their supported clip pieces, so that instead of lying lengthwise of the trough or enclosed space of the superposed molding strip, they now lie transversely thereof, with their large head portions K engaging within the molding strip, the neck portions N resiliently engaging the opposing edges L of the inturned flanges of the molding strip, and their tapering body portions ready to be forced through correspondingly spaced apertures in the panel. The molding strip thus equipped or laden with the several attaching clips may then be lifted over from the mechanism ready for immediate attachment to a panel or for storage until needed, and a new set of clips positioned in the top apertures of the several turrets, and as soon as these have been turned to their initial position once more by actuation of the lever E in the reverse direction from that already described, the positioning of the new set of clips in another molding strip may be proceeded with.

Figure 6:
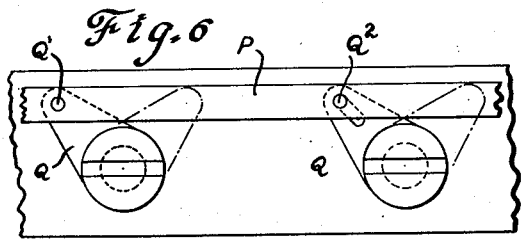
Figure 6 is a fragmentary plan view suggesting the use of projecting lever mechanisms connecting each turret with the lengthwise movable bar, instead of the rack gear wheels shown in Figure 1.

In Figure 6 I have illustrated an equivalent structure for the rack bar and gear wheel construction shown in Figure 1. From each turret or stud member there projects a lever Q, whose outer end is pivotally connected, as at Q', to the actuating bar P, which is limitedly movable lengthwise of the frame in the same manner as the rack bar B already described. If the supports in the frame in which this bar P are made sufficiently wide so that, as it moves lengthwise, it may also swing out laterally as the ends of the levers Q force it to do incident to their swing, plain pivoting, as shown at Q', will constitute a sufficient operative connection between the several levers and the bar P; otherwise the slotted pivotal connection shown at Q² may be employed.

As already brought out in the brief description of alternative Figure 7, by no means all of the molding strips designed for positioning upon motor vehicle bodies or the like are fabricated in straight contour, and, even as to the mechanism illustrated in Figures 1 and 2, it will be obvious that under some circumstances a variant alignment of the clip-holding turrets from that there shown might often meet the problem of dealing with other than straight pieces of molding strip. If, however, the intentional curvature of the molding strip be as pronounced as is illustrated in Figure 7, it will be obvious that clip-holding turrets whose axes of rotation may be positioned other than perpendicular to the plane of the supporting base piece will be needed for the contemporaneous installation, within the contour of the molding strip, of the several attaching clips which may be required. To this end I have devised the mechanism illustrated in Figures 7 to 12 inclusive, consisting preferably of a supporting base R upon or relatively to which are positioned whatever number of supports, as S or T, may be required for holding in suitably curved position the block-held molding strip U flanked by temporary confining pieces U', which are drawn about the lateral faces of the molding strip by the bolts U² which pass through the backing block U³. When the suitable positioning of the molding strip upon its supports has been attended to, the various clip-holding units V, each bearing a clip K' in its recessed top portion V⁸, are then applied within the flanged edged under face of the molding strip, and thanks to the fact that the supporting stem V² of each of the turret units terminates at its bottom portion in a knuckle V³ which is held down by a plate V⁴, it will be obvious that any one of these modified forms of turret pieces can be applied to the molding strip at such angle relatively to the plane of the supporting base R as the curvature of the molding strip at any point along its length may require, either truly vertically as shown in the central portion of Figure 7, or inclined to one side or the other of the supporting piece, as shown at the left end and right end of Figure 7.

With each of these angularly tiltable turret pieces there is connected a take off hose W', which is connected with a common pneumatic or pressure-supply pipe W. When all of the turret heads with their supported clip pieces K' have been accurately positioned within the molding strip, sufficient air pressure is turned on from a suitable external source to actuate each one of the turrets through a 90° angle, the preferred form of such turning mechanism being shown at V⁵ and V⁶ in Figure 12, a relief or vacuum-preventing vent being indicated at V⁹. This pneumatically actuated turning being against the resilient opposition of the spring V⁷, shown elevationally in Figure 10, and in plan in Figure 11, it will be obvious that as soon as the pressure is terminated, the action of the spring will effect the return of the turret to its initial position, that is, with its kerf or clip-holding recess V⁸ extending lengthwise of the supporting base R and of the molding strip being acted upon. This, however, must not be allowed to happen until the molding strip then being acted upon has been removed, otherwise the attaching clips K, now turned to transverse position relatively to the molding strip U would be disengaged therefrom, whereas when the molding strip is lifted away from the attaching means shown, the clips are firmly and permanently installed in their interlocking position relatively to the molding strip, and ready for attachment to the supporting panel for whose ornamentation the molding strip is designed.

What I claim is:

1. An apparatus for positioning attaching clips in a molding strip, having in combination with a fixed frame, a plurality of turret members rotatably positioned thereon in selected positions of alignment, each of said turret members being formed to receive a clip positioned in its top portion, a rack member operatively connected with each of said turret members and supported in position of limited lengthwise movement with respect to said fixed frame, and means for regulatably actuating said rack member lengthwise of itself and of said fixed frame to effect the contemporaneous rotative movement of said turrets and consequently the positioning of the head portions of their contained clip members within a superposed molding strip.

2. In combination with a supporting frame a plurality of turret members spacedly and rotatably positioned thereon in alignment with one another, each of said turret members being formed to hold an attaching clip in superiorly exposed position for their common engagement within the concavity of a molding strip positioned thereover, and manually operable means connected with each of said turret members whereby the rotation of each through substantially a ninety degree angle may be concurrently effected, thereby moving the several clip members supported by the turrets to interlocking position of their head portions relatively to the molding strip.

3. Means for contemporaneously positioning the head portions of a plurality of attaching clips within the concavity of a molding strip, comprising in combination with a supporting frame a plurality of rotatable stud members spacedly positioned along said frame, each of said stud members being formed to hold a clip member with its head portion in exposed relation and in alignment with the other members of the series, for common engagement by the concavity of a temporarily superposed molding strip, and manually actuatable means for effecting the rotative movement of said stud members and their supported clips through a quarter turn thereby moving each of the supported clips to position of interengagement of its head with the molding strip.

4. Means for effecting the positioning of a plurality of attaching clips in spaced relation along a molding strip at a single operation, comprising, in combination, with a supporting frame, a manually operable bar member supported in position of limited slidability lengthwise of said frame, a plurality of stud members rotatably positioned on said frame at selected intervals therealong, the top portion of each of said stud members being formed for the holding of the lower portion of a clip member with the head portion projecting thereabove, and means operatively connecting said bar member and each of said stud members whereby each of the latter is caused to turn through substantially a ninety degree angle when the bar member is actuated lengthwise of the frame, thereby turning the supported clip members accordingly and effecting the clinching of their head portions within the concavity of a superiorly positioned molding strip.

5. In combination with a plurality of limitedly rotatable turret members positioned in alignment one with another, the top portion of each turret member being formed for the holding of an inserted clip member with its head portion in exposed position thereabove, a manually operable actuating member for said turret members having an operative connection with each whereby said turret members and their supported clips may be turned about the several axes of said turret members to effect the clinching engagement of the head portions of the several clips within the concavity of a temporarily superposed molding strip.

6. In combination with a supporting base and with means for supporting a molding strip in position thereover, a plurality of clip-supporting members spacedly positioned on said base in locations of potential operative activation relatively to a supported molding strip, and means for regulatedly effecting the rotative movement of said clip-supporting members to cause the positioning of their supported clips along the molding strip.

7. In combination with a series of rotatable turret members, each capable of supporting a clip in its top portion in position of potential installation between the inturned flanges of a molding strip, externally regulatable means operatively connected with each of said turret members whereby they may be simultaneously turned about their respective axes, thereby effecting the clinching of the heads of the several clips within the molding strip.

8. Means for contemporaneously effecting the positioning of a plurality of attaching clips between the inturned flanged edges of a molding strip, comprising, in combination with means for holding a molding strip in suitable receiving position, a plurality of axially rotatable members the top portion of each of which formed for the reception of a clip member in position of general lengthwise alignment of the head thereof relatively to the offered molding strip, and externally regulatable means operatively connected with each of said axially rotatable members whereby they may be turned through an angle of such degree as to effect the clinching of their respectively supported clip members with the adjacent flanged portions of the molding strip.

9. Means for effecting the mounting in multiple of attaching clips upon the inwardly flanged under side of a molding strip, comprising a plurality of selectively aligned rotatable members, each of which is contoured at its top for the temporary lodgment of the body portion of an attaching clip, and means for contemporaneously actuating said rotatable members through an arc of selected angular size, thereby effecting the clinching of the head portions of the several clips with the flanged under side of a presented molding strip.

WILLIAM R. WILEY.